United States Patent [19]
Kudamatsu et al.

[11] 3,846,467
[45] Nov. 5, 1974

[54] 2-METHOXY-5-FLUOROBENZYL N,N-DIMETHYL-THIOLCARBAMATE

[75] Inventors: Akio Kudamatsu, Kanagawa-ken; Masao Miyamoto; Nobuo Fukazawa, both of Tokyo, all of Japan

[73] Assignee: Bayer Aktiengesellschaft, Leverkusen, Germany

[22] Filed: Sept. 5, 1972

[21] Appl. No.: 286,621

Related U.S. Application Data
[63] Continuation-in-part of Ser. No. 875,546, Nov. 10, 1969, abandoned.

[30] Foreign Application Priority Data
Nov. 12, 1968 Japan.................................. 43-82249

[52] U.S. Cl................. 260/455 A, 424/300, 71/100
[51] Int. Cl........................................... C07c 154/02
[58] Field of Search................... 71/100; 260/455 A; 424/300

[56] References Cited
UNITED STATES PATENTS
3,687,653  8/1972  Bollinger et al. ..................... 71/100

FOREIGN PATENTS OR APPLICATIONS
741,552  11/1969  Belgium........................ 260/455 A Primary Examiner—Lewis Gotts
Assistant Examiner—D. R. Phillips
Attorney, Agent, or Firm—Burgess, Dinklage & Sprung

[57] ABSTRACT

2-Methoxy-5-fluorobenzyl N,N-dimethylthiolcarbamate of the formula

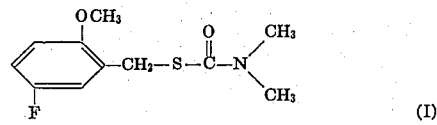

(I)

which possesses herbicidal, acaricidal and nematocidal properties.

1 Claim, No Drawings

2-METHOXY-5-FLUOROBENZYL N,N-DIMETHYL-THIOLCARBAMATE

This application is a continuation-in-part of U.S. application Ser. No. 875,546, filed Nov. 10, 1969, now abandoned.

The present invention relates to and has for its objects the provision of 2-methoxy-5-fluorobenzyl N,N-dimethylthiocarbamate which possesses herbicidal, acaricidal and nematocidal properties, active compositions in the form of mixtures of such compound with solid and liquid dispersible carrier vehicles, and methods for producing such compound and for using such compound in a new way, especially for combating weeds, e.g. undesired plants, acarids and nematodes and the like, with other and further objects becoming apparent from a study of the within specification and accompanying examples.

It is already known that pentachlor-phenol (A), which may be designated PCP, and 2-methyl-4-chlorophenoxy-acetic acid, (B), which may be designated MCP, as well as S-benzyl-N,N-dimethyl-dithiocarbamate (C), which may be designated T, possess herbicidal properties.

Pentachlorophenol (A), i.e., PCP, is used for controlling barnyard grass. However, PCP possesses disadvantages such as an irritant effect on human skin and mucous membranes and specific toxicity to fish and shells, which limit the application periods and fields of use of such compound. To control spikerushes (*Eleocharis acicularis*) which commonly grow together with barnyard grass (*Echinochloa crus-galli*), 2-methyl-4-chlorophenoxyacetic acid (B), i.e., MCP, is used, but this compound is not effective in controlling barnyard grass.

Accordingly, in order to control simultaneously both barnyard grass and spikerushes, the main types of weeds found in paddy fields, a mixture of PCP and MCP is generally used.

It is furthermore known from French Pat. No. 1,328,112 that benzyl dialkylthiocarbamates, i.e., benzyl, di-butyl, di-iso-propyl-, di-n-propyl and di-ethylthiocarbamate possess herbicidal properties. In said French Patent it is indicated that benzyl di-iso-propyl thiocarbamate (D) is an active herbicide against wild oats (Avena fatua).

It has now been found, in accordance with the present invention that 2-methoxy-5-fluorobenzyl N,N-dimethylthiolcarbamate of the formula

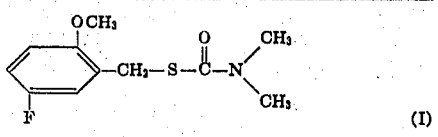

exhibits strong, especially selective herbicidal properties, as well as acaricidal and nematocidal properties.

It has furthermore been found in accordance with the present invention that the compound of formula (I) above may be produced in accordance with any of three variant processes, e.g.;

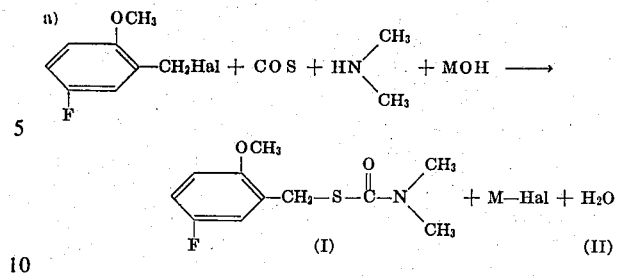

wherein
Hal is a halogen atom such as chloro, bromo, iodo or fluoro, especially chloro; and
M is an alkali metal such as sodium, potassium, and the like, especially sodium; or

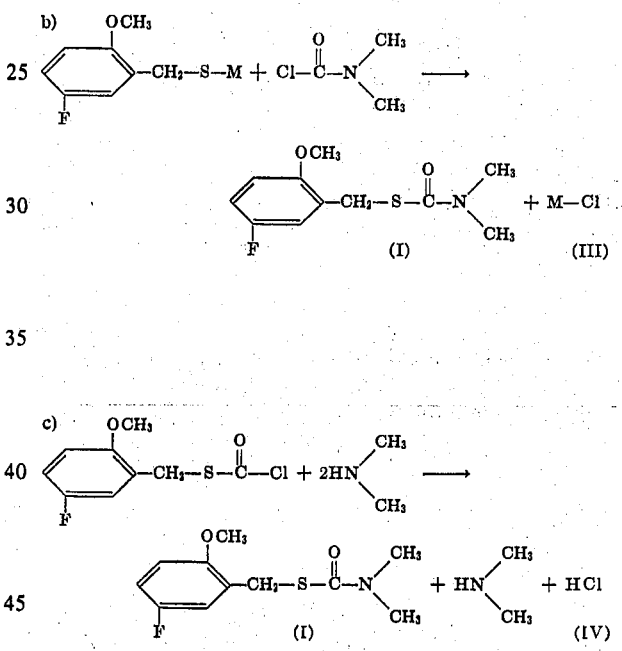

Surprisingly, the particular new compound of formula (I) above according to the present invention shows both higher and more specific herbicidal effectiveness than the previously known compounds which are known to be usable for such purposes, e.g. compounds (A), (B), (C) and (D) above. It is also more effective than counterparts differing only in replacement of the fluorine atom by chlorine or bromine. The instant compound is especially effective as a herbicide in the control of weeds in paddy rice fields, particularly barnyard grass and spikerushes, and exhibit a remarkable effect in killing such weeds, with only slight, if any, phytotoxic effect toward cultivated plants such as rice. The instant compound also shows acaricidal and nematocidal effectiveness. The instant compound therefore represents a valuable contribution to the art.

The starting materials which may be used for reaction variants (a), (b) and (c) are well known and can be prepared in known manner. ketones The process according to each of the variants is preferably carried out in the presence of an inert organic solvent (this term includes a mere diluent). Examples of such solvents include aliphatic or aromatic hydrocarbons (which may be halogenated), for example benzine, methylene chloride, chloroform, carbon tetrachloride, benzene, chlorobenzene, toluene, and xylene; ethers, for example diethyl ether, dibutyl ether, dioxan, and tetrahydrofuran; aliphatic alcohols or detones which have low boiling points, for example methanol, ethanol, isopropanol, acetone, methyl ethyl ketone, methyl isopropyl ketone, and methyl isobutyl ketone; and the like. Lower aliphatic nitriles, for example acetonitrile, propionitrile, and the like, may also be used.

The reaction according to all of the process variants may be carried out within a fairly wide temperature range, but in general at temperatures from substantially between about 0°–100°C, preferably between about 10°–60°C.

In carrying out process variant (b) one may for example proceed as follows:

1 mole of the carbamyl chloride is dissolved in one of the above-noted solvents, preferably methyl ethyl ketone, and to this solution is added 1 mole of the alkali salt of the alkoxybenzyl mercaptan and the mixture is refluxed, e.g. at 50°–60°C, with stirring. Then the mixture is filtered to remove alkali metal chloride precipitate, and the solvent removed by distillation. If desired, the crude crystals can be purified by recrystallizing, for instance from alcohol.

Advantageously, the instant active compound exhibit a strong herbicidal potency and can therefore be used as weed-killers. By weeds in the sense used herein are meant all plants which grow in places where they are not desired. Whether the active compound according to the present invention acts as total or selective herbicidal agent depends on the amount applied, as the artisan will appreciate.

The active compound according to the present invention can be used for example in the case of the following plants: dicotyledons, such as mustard (Sinapis), cress (Lepidium), catch weed (Galium), common chickweed (Stellaria), camomile (Matricaria), French weed (Galinsoga), goose-foot (Chenopodium), stinging nettle (Urtica), groundsel (Senecio), wild amatanth (Amaranthus), common purslane (Portulaca), cotton (Gossyppium), beets (Beta), carrots (Daucus), beans (Phaseolus), potatoes (Solanum), coffee (Coffea), cabbage (Brassica), spinach (Spinacia); monocothledons, such as timothyl (Phleum), meadowgrass (Poa), fescue (Festuca), finger grass (Digitaria), goosegrass (Eleusine), green foxtail (Setaria), raygrass (Lolium), cheat (Bromus), barnyard grass (Echinochloa), maize (Zea), rice (Oryza), oats (Avena), barley (Hordeum), wheat (Triticum), millet (Panicum) and sugar cane (Saccharum); and the like.

In particular, broad leaved weeks such as *Monochoria vaginalis*, *Rotala indica*, *Lindernia pyxidaria*, *Gratiola japonica*, and the like, may be controlled by the active compond of the present invention.

The indtant compound is preferably used as selective herbicide and especially when applied to soil before germination, although it exhibits a particularly good selectivity when applied either before or after emergence.

The instant active compound possesses excellent herbicidal properties, being especially effective in the control of weeds in paddy fields, particularly barnyard grass and spikerushes. Thus, when barnyard grass is treated in its pre-emergence stage or in its one to three leaf stage under irrigated conditions with the present compound such compound is found to exhibit a strong herbicidal effect. This is technically of great importance, because most of the herbicides now on the market are only effective against barnyard grass before or immediately after germination. Moreover, since the instant compound is less phytotoxic to rice plants, it can be applied 1 to 2 weeks after the transplantation of rice plants to control weeds in paddy fields, for which time span no appropriate weed-controlling method has been found heretofore, the latter being a great advantage in connection with labor-saving considerations in agricultural cultivation.

Since the compound of the present invention possesses in particular, strong herbicidal activity by reason of root-absorption, it can also be utilized effectively as a non-selective or a selective herbicide (depending on the application methods) against weeds growing in places other than paddy fields.

Furthermore, the present compound is an effective acaricide, e.g., when applied to plants, especially against spider mites, including resistant strains, substantially without phytotoxicity to the plants.

It is also possible to control rice white-tip nematodes with the instant active compound, e.g., by treating seed contamenated therewith.

The active compound according to the instant invention can be utilized, if desired, in the form of the usual formulations or compositions with conventional inert (i.e., plant compatible or herbicidally inert) pesticide diluents or extenders, i.e., diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc.), halogenated, especially chlorinated, aromatic hydrocarbons (e.g., chlorobenzenes), paraffins (e.g., petroleum fractions), chlorinated aliphatic hydrocarbons (e.g., methylene chloride, etc.), alcohols (e.g., methanol, ethanol, propanol, butanol, etc.), ethers, ether-alcohols (e.g., glycol monomethyl ether, etc.), amines (e.g., ethanolamine, etc.), amides (e.g., dimethyl formamide, (etc.), sulfoxides (e.g., dimethyl sulfoxide, etc.), ketones (e.g. acetone, etc.), and/or water; as well as inert dispersible finely divided solid carriers, such as ground natural minerals (e.g., kaolins, alumina, silica, chalk, i.e. calcium carbonate, talc, kieselguhr, montmorillonite, clay, etc.), and ground synthetic minerals (e.g., highly dispersed silicic acid, silicates, e.g. alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as pulp sulfite waste liquors, methyl cellulose, lignin, etc.

As will be appreciated by the artisan, the active compound according to the instant invention may be employed alone or in the form of mixtures with one another and/or with such solid and/or liquid dispersible carrier vehicles and/or with other known compatible active agents, especially plant protection agents, such as other herbicides, acaricides and nematocides, or insecticides, fungicides, bactericides, plant growth regulators, soil disinfectants, including phenoxy compounds, chlorophenol compounds, carbamates, diphenyl ethers, urea compounds, triazine compounds, and other known agricultural chemicals and/or fertilizers, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.001–30%, preferably 0.05–10%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.001–95%, and preferably 0.05–95%, by weight of the mixture.

In particular, the amount of active compound applied per unit area varies according to the purpose intended, i.e. the effect desired, and the mode of application. In general, higher quantities of substantially between about 6–40 kg of active compound per hectare are applied for total or nonselective herbicidal activity, whereas lower quantities of substantially between about 1.25–5 kg of active compound per hectare are applied for selective herbicidal activity, i.e., irrespective of the presence or absence of the carrier vehicle.

The active compound can also be used in accordance with the well-known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g., about 20–100% by weight of the active compound.

While the active compound can be used as a herbicide particularly effectively according to the pre-emergence method, it is also effective when used according to the post-emergence method.

Especially when application is carried out mainly before the germination of cultivated plants, the general conditions of cultivation are not so important, but the quantity of active compound to be applied per unit area and the application method are important, as the artisan will appreciate.

Furthermore, the present invention contemplates methods of selectively killing, combatting or controlling undesired plants, e.g., weeds, and the like, which comprise applying to at least one of (a) such weeds and (b) their habitat i.e. the locus to be protected, a herbicidally effective or toxic amount of the particular active compound of the invention alone or together with a carrier vehicle as noted above. The instant formulations or compositions are applied in the usual manner, for example by spraying, atomizing, scattering, dusting, watering, sprinkling, pouring, dressing, and the like.

It will be realized, of course, that the concentration of the particular active compound utilized in admixture with the carrier vehicle will depend upon the intended application and may be varied within a fairly wide range depending upon the weather conditions, the soil, the purpose for which the active compound is used, e.g., for total or only selective herbicidal effect, and the plants which are to be controlled or protected. Therefore, in special cases, it is possible to go above or below the aforementioned concentration ranges and amounts per unit area.

The following illustrate, without limitation, examples of formulations which may be used in accordance with the present invention:

Example 1

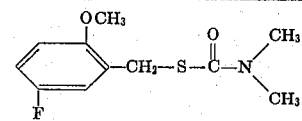

Into a 1 liter three neck flask containing 135g of 40% dimethylamine solution [54g (1.2 moles) of dimethylamine] there were added 200 ml of water and then 40g (1 mole) of sodium hydroxide dissolved in water to a concentration of 25%. The solution was cooled to 0° to −5°C and was kept under stirring. Then 60g (1 mole) of carbon oxysulfide was introduced into the three neck flask while cooling and stirring the solution. After completion of the introduction of carbon oxysulfide, 139.6g (0.8 mole) of 2-methoxy-5-fluoro-benzylchloride dissolved in 150 ml of methylalcohol were added to the flask followed by stirring at 0° to −5°C for 2 hours.

The reaction was completed by vigorously stirring at 10° to 25°C for 5 hours. Then, cold water was added to obtain the objective crude crystal. By recrystallization from ethyl alcohol, 187.5 g of white crystals of 2-methoxy-5-fluorobenzyl-N,N-dimethylthiolcarbamate were obtained.

Yield: 96.4 %; m.p. 104°–104.5°C.

Example 2

Test against paddy weeds under pre-emergence treatment with irrigation conditions
(test in concrete frame / field test)
Solvent: 5 parts by weight of acetone
Emulsifier: 1 part by weight of benzyloxypolyglycolether 1 part by weight of active compound and the above-mentioned amount of the emulsifier and solvent were mixed and formulated into emulsifiable concentrates and then the mixture thus obtained was diluted with water to the desired final concentration.

Test procedure:

Into a concrete frame 50 cm long, 50 cm broad and 30cm deep were placed successive layers as follows: conglomerate stones (3 cm deep), then sand (3 cm deep), then paddy soil (5 cm deep). These layers were well pressed down. Then they were covered with 5 cm of screened paddy soil and paddy soil containing seeds of barnyard grass (*Echinochloa crus-galli*), chufa (*Cyperus microiria*), monochoria (*Monochoria vaginallis*), broad-leaved weeds and fragments of spikerush (*Eleocharis acicularis*). Two rice seedlings (Kinmaze variety) at the 2 leaves stage were transplanted in each of four places in the soil and then the soil was maintained under irrigation (inundation) condition.

Immediately thereafter, the preparation of active compound was applied to the concrete frame. The water (under irrigation condition) 6 cm deep was reduced for 2 days by an amount of 3 cm a day just after the application and maintained under irrigation (inundation) conditions 4 cm deep by further watering. 4 weeks after the injection, the herbicidal effect on the weeds and the phytotoxicity to the rice plants were evaluated on scales from 0 to 5 as follows:

| Effect on the weeds | | Dead |
|---|---|---|
| 5 | Herbicidal rate in comparison with untreated area | more than 95 % |
| 4 | do. | more than 80 % |
| 3 | do. | more than 50 % |
| 2 | do. | more than 30 % |
| 1 | do. | more than 10 % |
| 0 | do. | less than 10 % (no effect) |

| Phytotoxicity | | Dead |
|---|---|---|
| 5 | Phytotoxicity rate in comparison with untreated area | more than 90 % |
| 4 | do. | more than 50 % |
| 3 | do. | more than 30 % |
| 2 | do. | less than 30 % |
| 1 | do. | less than 10 % |
| 0 | do. | 0 % (no phyto-toxicity) |

The average results of the test are shown in Table 1 below wherein:
a = Barnyard grass (*Echinochloa crus-galli*)
b = Chufa (*Cyperus microiria*)
c = Monochoria (*Monochoria vaginalis*)
d = Broad-leaved weeds: Rotala indica, Koehne and False pempernel, etc.
e = Spikerush (*Eleocharis acicularis*)

TABLE 1

Test against paddy weeds under pre-emergence treatment with irrigation conditions (test in concrete frame/field test)

| | Chemical structure | Content of active ingredient (g./10 ares) | Effect a | b | c | d | e | Phytotoxicity on rice plant |
|---|---|---|---|---|---|---|---|---|
| Compound E | OCH₃ / —CH₂—S—C(=O)—N(CH₃)₂ / Cl | 250 | 5 | 5 | 4 | 5 | 4 | 0 |
| | | 125 | 4–5 | 4 | 4 | 4 | 4 | 0 |
| | | 62.5 | 1 | 2 | 1 | 2 | 1 | 0 |
| Compound F | OCH₃ / —CH₂—S—C(=O)—N(CH₃)₂ / Br | 250 | 5 | 5 | 4 | 5 | 5 | 0 |
| | | 125 | 5 | 4 | 4 | 4 | 4 | 0 |
| | | 62.5 | 1 | 2 | 2 | 2 | 1 | 0 |
| Compound of this invention (I) | OCH₃ / —CH₂—S—C(=O)—N(CH₃)₂ / F | 250 | 5 | 5 | 5 | 5 | 5 | 0 |
| | | 125 | 5 | 5 | 5 | 5 | 5 | 0 |
| | | 62.5 | 5 | 5 | 5 | 5 | 5 | 0 |
| Control | | | 0 | 0 | 0 | 0 | 0 | 0 |

Example 3

Test against paddy weeds under post-emergence treatment with irrigation conditions (test in concrete frame / field test)

Solvent: 5 parts by weight of acetone
Emulsifier: 1 part by weight of benzyloxypolyglycolether 1 part by weight of active compound and the above-mentioned amount of the mulsifier and solvent were mixed and formulated into emulsifiable concentrates and then the mixture thus obtained was diluted with water to the desired final concentration.

Test procedure:

Into a concrete frame 50 cm long, 50 cm broad and 30 cm deep were placed successive layers as follows: conglomerate stones (3 cm deep), then sand (3 cm deep), then paddy soil (5 cm deep). These layers were well pressed down. Then they were covered with 5 cm of screened paddy soil and paddy soil containing seeds of barnyard grass (*Echinochloa crus-galli*), chufa (*Cyperus microiria*), monochoria (*Monochoria vaginalis*), broadleaved weeds and fragments of spikerush (*Eleocharis acicularis*). Two rice seedlings (Kinmaze variety) at the 2 leaves stage were transplanted in each of four places in the soil and then the soil was maintained under irrigation (inundation) condition.

10 – 15 days after transplanting, when the barnyard grass had grown to the 2-3 leaves stage, the preparation of active compound was applied to the concrete frame.

The water (under irrigation condition) 6 cm deep was reduced for 2 days by an amount of 3 cm a day just after the application and then maintained under irrigation (inudation) conditions 4 cm deep by further watering. 4 weeks after the injection, the herbicidal effect on the weeds and the phytotoxicity to the rice plants were evaluated in accordance with the same manner as in Example 2. The average results of the test are shown in Table 2 below wherein:

a = Barnyard grass (*Echinochloa crus-galli*)
b = Chufa (*Cyperus microiria*)
c = Monochoria (*Monochoria vaginalis*)
d = Broad-leafed weeds: Rotala indica, Koehne and False pempernel, etc.
e = Spikerush (*Eleocharis acicularis*)

Example 4

Test of pre-emergence soil treatment against various plants.

To produce a suitable preparation of the particular active compound, 1 part by weight of such active compound is mixed with 5 parts by weight of solvent (acetone) and 1 part by weight of emulsifier (benzyloxypolyglycol ether), and the resulting emulsifiable concentrate is then diluted with water to the desired final concentration.

Seeds of the test plants are sown in normal soil and after 24 hours the preparation of the given active compound is sprayed onto the test plants. After 3 weeks, the degree of damage to the test plants is determined and characterized by the values 0 to 5, which have the following meaning:

0 : No effect
1 : Slight damage or slight growth delay
2 : Marked damage or growth delay
3 : Remarkable damage or only 50% germinated
4 : Plants are partially destroyed after germination or only 25% germinated
5 : Plants are completely dead or no germination occurs The particular active compounds tested, their amount per unit area, and the results obtained can be seen from the following Table 4:

TABLE 2

Test against paddy weeds under post-emergence treatment with irrigation conditions (test in concrete frame/field test)

| | Chemical structure | Content of active ingredient (g./10 ares) | Effect | | | | | Phytotoxicity on rice plant |
|---|---|---|---|---|---|---|---|---|
| | | | a | b | c | d | e | |
| Compound E | 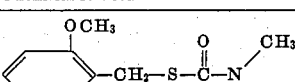 | 250<br>125<br>62.5 | 3-4<br>2<br>0 | 2<br>0<br>0 | 4<br>3<br>0 | 4<br>3<br>0 | 5<br>4<br>0 | 0<br>0<br>0 |
| Compound F | 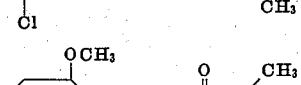 | 250<br>125<br>62.5 | 3-4<br>2<br>0 | 2<br>0<br>0 | 4<br>3<br>0 | 4<br>3<br>0 | 5<br>4<br>0 | 0<br>0<br>0 |
| Compound of this invention (I) |  | 250<br>125<br>62.5 | 5<br>5<br>4 | 5<br>5<br>.5 | 5<br>5<br>4-5 | 5<br>5<br>5 | 5<br>5<br>4 | 0<br>0<br>0 |
| Control | | | 0 | 0 | 0 | 0 | 0 | 0 |

TABLE 4

Pre-emergence soil treatment against various plants (Pot test)

| Chemical structure (compound) | Content of active ingredient, kg./ha. | Wheat | Barley | Rice | Cotton | Maize | Cabbage | Echinochloa | Portulaca | Chenopodium | Stellaria | Amaranthus | Digitaria |
|---|---|---|---|---|---|---|---|---|---|---|---|---|---|
| (E) | 10<br>5<br>2.5<br>1.25<br>0.625 | 1-2<br>0<br>0<br>0<br>0 | 2<br>0<br>0<br>0<br>0 | 3<br>0<br>0<br>0<br>0 | 2<br>0<br>0<br>0<br>0 | 2<br>0<br>0<br>0<br>0 | 1-2<br>0<br>0<br>0<br>0 | 5<br>5<br>5<br>5<br>2 | 5<br>5<br>5<br>3-4<br>1-2 | 5<br>5<br>5<br>3-4<br>2 | 5<br>5<br>5<br>3-4<br>2 | 5<br>5<br>5<br>3-4<br>1-2 | 5<br>5<br>5<br>3-4<br>1 |
| (I) (compound of this invention) | 10<br>5<br>2.5<br>1.25<br>0.625 | 1-2<br>0<br>0<br>0<br>0 | 2<br>0<br>0<br>0<br>0 | 1-2<br>0<br>0<br>0<br>0 | 2<br>0<br>0<br>0<br>0 | 1-2<br>0<br>0<br>0<br>0 | 2<br>0<br>0<br>0<br>0 | 5<br>5<br>5<br>5<br>4 | 5<br>5<br>5<br>5<br>5 | 5<br>5<br>5<br>5<br>5 | 5<br>5<br>5<br>5<br>5 | 5<br>5<br>5<br>5<br>5 | 5<br>5<br>5<br>5<br>4 |

It will be appreciated that the instant specification and examples are set forth by way of illustration and not limitation, and that various modifications and changes may be made without departing from the spirit and scope of the present invention.
What is claimed is:
1. 2-Methoxy-5-fluorobenzyl N,N-dimethylthiolcarbamate of the formula
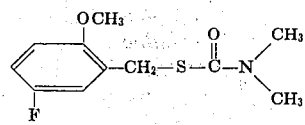
(I)